(12) United States Patent
Qiu

(10) Patent No.: US 9,841,626 B2
(45) Date of Patent: Dec. 12, 2017

(54) LIQUID CRYSTAL DEVICES

(71) Applicant: Shenzhen China Star Optoelectronics Technology Co., Ltd., Shenzhen, Guangdong (CN)

(72) Inventor: Yongyuan Qiu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 172 days.

(21) Appl. No.: 14/907,880

(22) PCT Filed: Jan. 7, 2016

(86) PCT No.: PCT/CN2016/070335
§ 371 (c)(1),
(2) Date: Jan. 27, 2016

(87) PCT Pub. No.: WO2017/080105
PCT Pub. Date: May 18, 2017

(65) Prior Publication Data
US 2017/0255057 A1    Sep. 7, 2017

(30) Foreign Application Priority Data

Nov. 11, 2015   (CN) .......................... 2015 1 0765848

(51) Int. Cl.
*G02F 1/1335* (2006.01)

(52) U.S. Cl.
CPC .. *G02F 1/133533* (2013.01); *G02F 1/133536* (2013.01); *G02F 1/133621* (2013.01); *G02F 2001/133538* (2013.01); *G02F 2202/36* (2013.01)

(58) Field of Classification Search
None
See application file for complete search history.

(56) References Cited

U.S. PATENT DOCUMENTS

| | | | |
|---|---|---|---|
| 9,529,228 B2* | 12/2016 | Banin | G02F 1/133617 |
| 2016/0154275 A1* | 6/2016 | Saneto | G02B 5/26 349/114 |
| 2016/0209706 A1* | 7/2016 | Miki | G02F 1/133617 |
| 2016/0320664 A1* | 11/2016 | Kang | G02F 1/133528 |
| 2016/0349573 A1* | 12/2016 | Ohmuro | G02F 1/1336 |
| 2017/0108726 A1* | 4/2017 | Yanai | G02F 1/13362 |
| 2017/0123267 A1* | 5/2017 | Yanai | G02F 1/133536 |

* cited by examiner

*Primary Examiner* — Ryan Crockett
(74) *Attorney, Agent, or Firm* — Andrew C. Cheng

(57) ABSTRACT

A LCD includes a liquid crystal panel, a backlight module opposite to the liquid crystal panel, at least one quantum rod film and at least one wavelength film. The quantum rod film is between the liquid crystal panel and the backlight module, and the wavelength film is between the quantum rod film and the liquid crystal panel. Light beams generated by the backlight module pass through the quantum rod film and the wavelength film in sequence to arrive the liquid crystal panel. By adopting the quantum rod film, the saturation of the LCD may be greatly enhanced.

8 Claims, 4 Drawing Sheets

LIQUID CRYSTAL DEVICES

BACKGROUND OF THE INVENTION

1. Field of the Invention

The present disclosure relates to liquid crystal display technology, and more particularly to a liquid crystal device (LCD) capable of enhancing color saturation.

2. Discussion of the Related Art

With the evolution of optical and semiconductor technology, flat panel displays have been developed. Among the flat panel displays, LCDs are characterized by attributes such as high space utilization efficiency, low power consumption, no radiation and low electromagnetic interference, and etc., and thus have been adopted in all aspects of productions.

LCDs may include a liquid crystal panel and a backlight module opposite to the liquid crystal panel. The backlight module provides lights to the liquid crystal panel such that the liquid crystal panel may display images by the backlit. During the display process, the colors are realized by the colorful photoresist. With the increasing demand of high saturation, it is critical to enhance the saturation of the LCDs.

SUMMARY

In order to overcome the above problem, a high saturation LCD is provided.

In one aspect, a liquid crystal device (LCD) includes: a liquid crystal panel and a backlight module opposite to the liquid crystal panel, wherein the LCD further includes at least one quantum rod film and at least one wavelength film, wherein the quantum rod film is between the liquid crystal panel and the backlight module, and the wavelength film is between the quantum rod film and the liquid crystal panel, light beams generated by the backlight module pass through the quantum rod film and the wavelength film in sequence to arrive the liquid crystal panel.

Wherein the quantum rod film further includes: a plurality of green quantum rod films, a plurality of red quantum rod films, and a plurality of blue quantum rod films, wherein the red quantum rod films and the blue quantum rod films are arranged in an alternative manner and are spaced apart from each other, and the green quantum rod film is arranged between the red quantum rod film and the blue quantum rod film.

Wherein an arrangement direction of the green quantum rod films is perpendicular to the polarization direction of the down polarizer, and the arrangement directions of the red quantum rod films and the blue quantum rod films are parallel to the polarization direction of the down polarizer.

Wherein the wavelength film includes a plurality of full-wavelength films, and a plurality of half-wavelength films arranged between two full-wavelength films, each of the green quantum rod films respectively faces toward one half-wavelength film, and each of the red quantum rod films respectively faces toward one full-wavelength film, and each of the blue quantum rod films respectively faces toward one full-wavelength films.

Wherein an arrangement direction of the green quantum rod films is perpendicular to the polarization direction of the down polarizer, and the arrangement directions of the red quantum rod films and the blue quantum rod films are perpendicular to the polarization direction of the down polarizer.

Wherein the wavelength film includes a plurality of half-wavelength films, and a plurality of full-wavelength films arranged between two half-wavelength films, each of the green quantum rod films respectively faces toward one full-wavelength film, and each of the red quantum rod films respectively faces toward one full-wavelength film, and each of the blue quantum rod films respectively faces toward one full-wavelength films.

Wherein each of the quantum rod film includes a plurality of double-colors quantum rod films spaced apart from each other, wherein each of the double-colors quantum rod films includes the green quantum rod film and the red quantum rod film, and the blue light beams generated by the backlight module pass through the quantum rod film and the full-wavelength films.

Wherein the LCD further includes a blue reflective polarizer between the quantum rod film and the backlight module, the blue light beams generated by the backlight module pass through the backplate reflective polarizer, the quantum rod film, and the wavelength films to arrive the liquid crystal panel.

Wherein an arrangement direction of the green quantum rod films is perpendicular to the polarization direction of the down polarizer, and the arrangement directions of the red quantum rod films and the blue quantum rod films are parallel to the polarization direction of the down polarizer; and the wavelength film includes a plurality of full-wavelength films, and a plurality of half-wavelength films arranged between two full-wavelength films, each of the green quantum rod films respectively faces toward one half-wavelength film, and each of the red quantum rod films respectively faces toward one full-wavelength film, and each of the blue quantum rod films respectively faces toward one full-wavelength films.

Wherein an arrangement direction of the green quantum rod films is parallel to the polarization direction of the down polarizer, and the arrangement directions of the red quantum rod films and the blue reflective polarizer are perpendicular to the polarization direction of the down polarizer; and the wavelength film includes a plurality of half-wavelength films, and a plurality of full-wavelength films arranged between two half-wavelength films, wherein each of the green quantum rod films respectively faces toward one full-wavelength film, and each of the red quantum rod films respectively faces toward one half-wavelength film, and the gap between two adjacent double-colors quantum rod films faces toward one half-wavelength films In view of the above, By adopting the quantum rod film,the saturation of the LCD may be greatly enhanced.

DETAILED DESCRIPTION OF THE EMBODIMENTS

Figure 1:
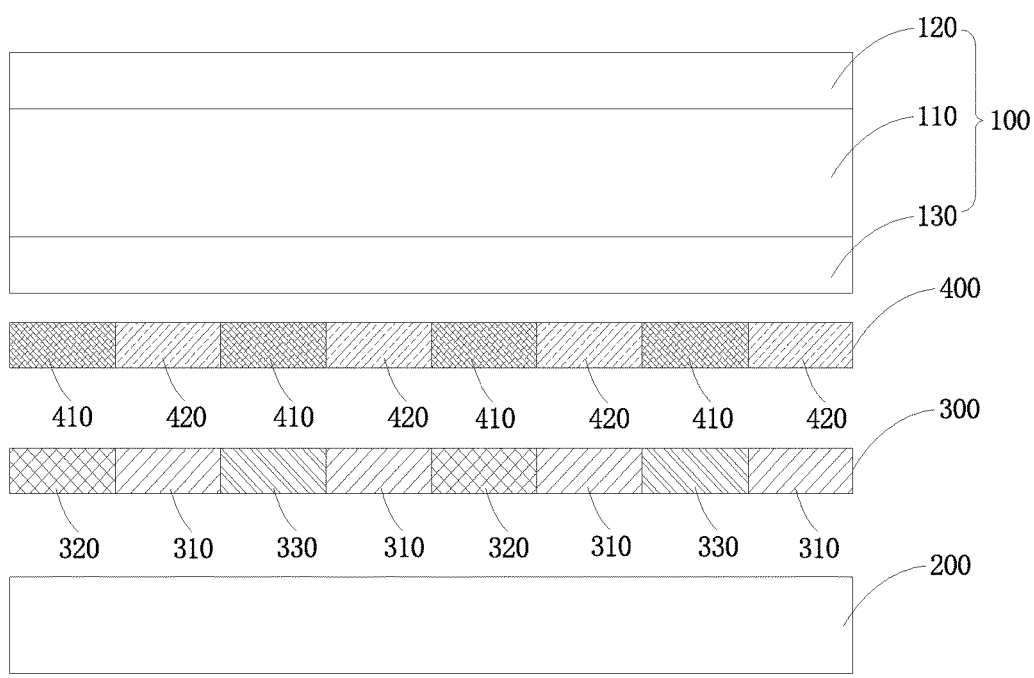
FIG. 1 is a schematic view of the LCD in accordance with a first embodiment.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

As shown in FIG. 1, the LCD includes a liquid crystal panel 100, a backlight module 200 opposite to the liquid crystal panel 100, a quantum rod film 300 between the liquid crystal panel 100 and the backlight module 200, and a wavelength film 400 between the quantum rod film 300 and the liquid crystal panel 100. The light beams generated by the backlight module 200 pass through the quantum rod film 300 and the wavelength film 400 and then arrive the liquid crystal panel 100 such that the liquid crystal panel 100 may display images. In the embodiment, preferably, the backlight module 200 generates, including but not limited to, the blue light beams. In another example, the backlight module 200 may generate ultraviolet (UV) lights.

The quantum rod is nanometer materials of two dimensions. As the electrons and the cavities are limited by the quantum, continuous band structure are transformed into a discrete level structure with molecular characteristics, and may be emit fluorescence after being activated. The difference between quantum rods and three-dimensional confinement quantum dots resides in that the polarization direction and the arrangement direction of the quantum rod is the same. According to the first embodiment of the present disclosure, the saturation of the LCD may be enhanced by adopting the quantum rods.

Referring to FIG. 1, the liquid crystal panel 100 includes a liquid crystal cell 110, a top polarizer 120 above the liquid crystal cell 110, and a down polarizer 130 below the liquid crystal cell 110. The polarization direction of the top polarizer 120 is perpendicular to the polarization direction of the down polarizer 130.

In the embodiment, the liquid crystal cell 110 may include a thin film transistor (TFT) array substrate, a color filter (CF) substrate, and a liquid crystal layer between the two substrates.

The quantum rod film 300 may include a plurality of green quantum rod films 310, a plurality of red quantum rod films 320, and a plurality of blue quantum rod films 330, wherein the red quantum rod films 320 and the blue quantum rod films 330 are arranged in an alternative manner and are spaced apart from each other. The green quantum rod film 310 is arranged between the red quantum rod film 320 and the blue quantum rod film 330.

The wavelength film 400 includes a plurality of full-wavelength films 410, and a plurality of half-wavelength films 420, wherein the full-wavelength films 410 are spaced apart from each other, and the half-wavelength film 420 is arranged between two full-wavelength films 410.

In the embodiment, each of the green quantum rod films 310 respectively faces toward one half-wavelength film 420, and each of the red quantum rod films 320 respectively faces toward one full-wavelength film 410, and each of the blue quantum rod films 330 respectively faces toward one full-wavelength films 410.

In addition, the arrangement direction of the green quantum rod films 310 is perpendicular to the polarization direction of the down polarizer 130, the arrangement directions of the red quantum rod films 320 and the blue quantum rod films 330 are parallel are the same with that of the down polarizer 130. That is, the arrangement direction of the red quantum rod films 320 is parallel to or the same with the arrangement direction of the blue quantum rod films 330, and the arrangement direction of the green quantum rod films 310 is perpendicular to that of the red quantum rod films 320 and the blue quantum rod films 330.

In this way, the light beams generated by the backlight module 200 activate the green quantum rod films 310, the red quantum rod films 320, and the blue quantum rod films 330. The polarization direction of the light beams emitted from the red quantum rod films 320 is the same with that of the light beams emitted from the blue quantum rod films 330. The polarization direction of the light beams emitted from the red quantum rod films 320 and the blue quantum rod films 330 is perpendicular to that of the light beams emitted from the green quantum rod films 310. The light beams emitted out from the green quantum rod films 310 pass through the half-wavelength films 420, and the polarization direction of the light beams is rotated by 90 degrees. The light beams emitted out from the red quantum rod films 320 and the blue quantum rod films 330 pass through the respective full-wavelength films 410, and the polarization direction of the light beams remains the same. At this moment, the polarization direction of the light beams passing through the wavelength film 400 is the same with the polarization direction of the down polarizer 130, and thus may pass through the down polarizer 130. Within the process, the light beams from the green quantum rod films 310 cannot pass through the full-wavelength films 410, and cannot arrive the down polarizer 130. Similarly, the light beams from the red quantum rod films 320 and from the blue quantum rod films 330 cannot pass through the half-wavelength films 420 and cannot arrive the down polarizer 130. In this way, the light beams of the three colors are prevented from being interfered by each other, and the purity of the light beams of the three colors may be enhanced. Thus, the saturation of the liquid crystal panel 100 may be enhanced.

Figure 2:
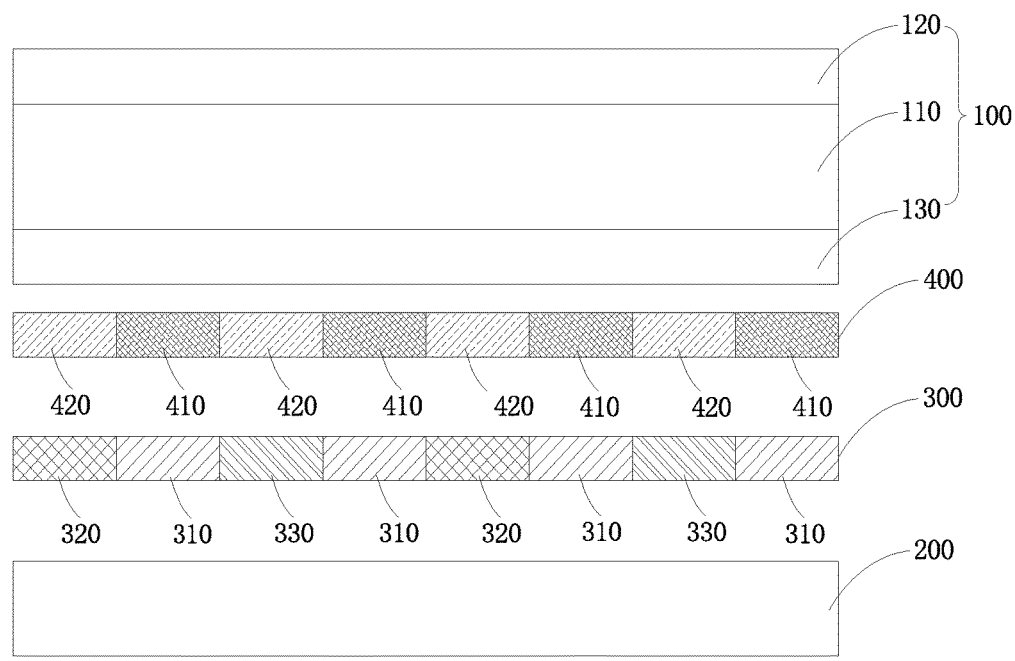
FIG. 2 is a schematic view of the LCD in accordance with a second embodiment.

FIG. 2 is a schematic view of the LCD in accordance with a second embodiment.

The difference between the first and the second embodiment resides in that: in the embodiment, each of the green quantum rod films 310 respectively faces toward one full-wavelength film 410, each of the red quantum rod films 320 respectively faces toward one half-wavelength film 420, and each of the blue quantum rod films 330 respectively faces toward one half-wavelength films 420.

In addition, the arrangement direction of the green quantum rod films 310 is perpendicular to the polarization direction of the down polarizer 130, the arrangement directions of the red quantum rod films 320 and the blue quantum rod films 330 are parallel are the same with that of the down polarizer 130. That is, the arrangement direction of the red quantum rod films 320 is parallel to or the same with the arrangement direction of the blue quantum rod films 330, and the arrangement direction of the green quantum rod films 310 is perpendicular to that of the red quantum rod films 320 and the blue quantum rod films 330.

In this way, the light beams generated by the backlight module 200 activate the green quantum rod films 310, the red quantum rod films 320, and the blue quantum rod films 330. The polarization direction of the light beams emitted from the red quantum rod films 320 is the same with that of the light beams emitted from the blue quantum rod films 330. The polarization direction of the light beams emitted from the red quantum rod films 320 and the blue quantum rod films 330 is perpendicular to that of the light beams emitted from the green quantum rod films 310. The light beams emitted out from the green quantum rod films 310 pass through the half-wavelength films 420, and the polarization direction of the light beams is rotated by 90 degrees. The light beams emitted out from the red quantum rod films 320 and the blue quantum rod films 330 pass through the respective full-wavelength films 410, and the polarization direction of the light beams remains the same. At this moment, the polarization direction of the light beams passing through the wavelength film 400 is the same with the polarization direction of the down polarizer 130, and thus may pass through the down polarizer 130. Within the process, the light beams from the green quantum rod films 310 cannot pass through the full-wavelength films 410, and cannot arrive the down polarizer 130. Similarly, the light beams from the red quantum rod films 320 and from the blue quantum rod films 330 cannot pass through the half-wavelength films 420 and cannot arrive the down polarizer 130. In this way, the light beams of the three colors are prevented from being interfered by each other, and the purity of the light beams of the three colors may be enhanced. Thus, the saturation of the liquid crystal panel 100 may be enhanced.

Figure 3:
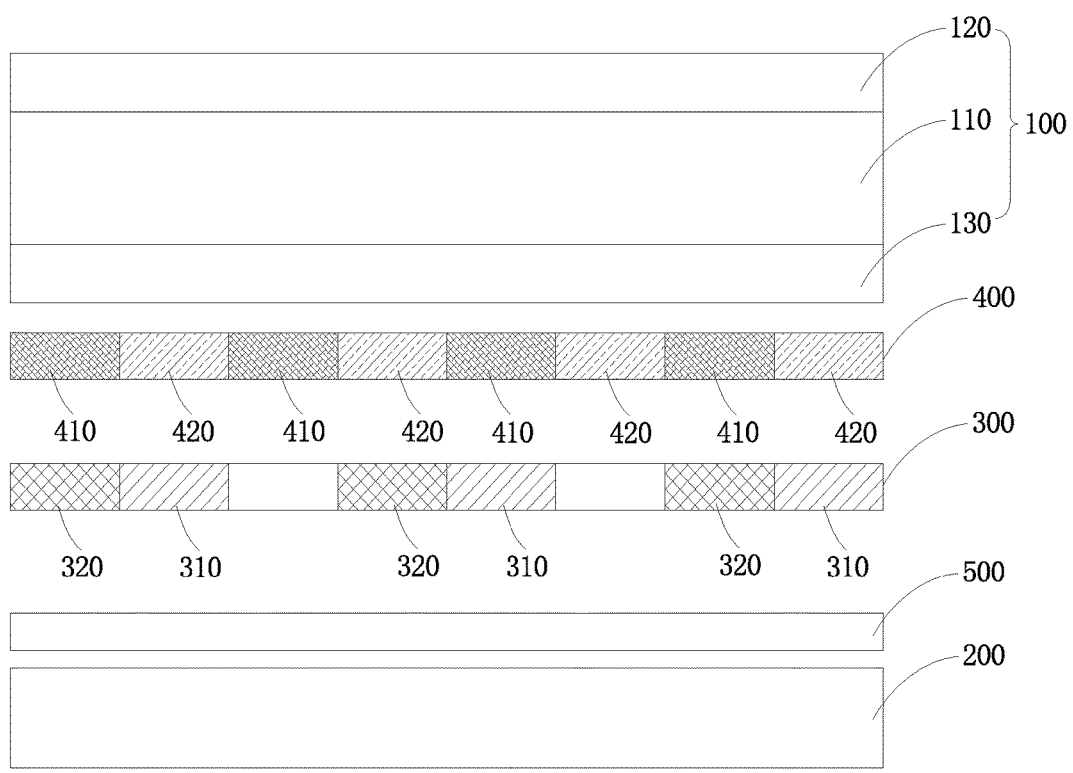
FIG. 3 is a schematic view of the LCD in accordance with a third embodiment.

FIG. 3 is a schematic view of the LCD in accordance with a third embodiment.

As shown in FIG. 1, the LCD includes a liquid crystal panel 100, a backlight module 200 opposite to the liquid crystal panel 100, a quantum rod film 300 between the liquid crystal panel 100 and the backlight module 200, and a wavelength film 400 between the quantum rod film 300 and the liquid crystal panel 100. The light beams generated by the backlight module 200 pass through the quantum rod film 300 and the wavelength film 400 and then arrive the liquid crystal panel 100 such that the liquid crystal panel 100 may display images. In the embodiment, preferably, the backlight module 200 generates, including but not limited to, the blue light beams. In another example, the backlight module 200 may generate ultraviolet (UV) lights.

The quantum rod is nanometer materials of two dimensions. As the electrons and the cavities are limited by the quantum, continuous band structure are transformed into a discrete level structure with molecular characteristics, and may be emit fluorescence after being activated. The difference between quantum rods and three-dimensional confinement quantum dots resides in that the polarization direction and the arrangement direction of the quantum rod is the same. According to the third embodiment of the present disclosure, the saturation of the LCD may be enhanced by adopting the quantum rods.

Referring to FIG. 3, the liquid crystal panel 100 includes a liquid crystal cell 110, a top polarizer 120 above the liquid crystal cell 110, and a down polarizer 130 below the liquid crystal cell 110. The polarization direction of the top polarizer 120 is perpendicular to the polarization direction of the down polarizer 130.

In the embodiment, the liquid crystal cell 110 may include a thin film transistor (TFT) array substrate, a color filter (CF) substrate, and a liquid crystal layer between the two substrates.

The quantum rod film 300 may include a plurality of double-colors quantum rod films spaced apart from each other. Each of the double-colors quantum rod films includes the green quantum rod film 310 and the red quantum rod film 320.

The LCD in the third embodiment also includes a blue reflective polarizer 500 between the quantum rod film 300 and the backlight module 200. The blue light beams generated by the backlight module 200 pass through the blue reflective polarizer 500, the quantum rod film 300, and the wavelength film 400 to arrive on the liquid crystal panel 100.

The wavelength film 400 includes a plurality of full-wavelength films 410, and a plurality of half-wavelength films 420, wherein the full-wavelength films 410 are spaced apart from each other, and the half-wavelength film 420 is arranged between two full-wavelength films 410.

In the embodiment, each of the green quantum rod films 310 respectively faces toward one half-wavelength film 420, and each of the red quantum rod films 320 respectively faces toward one full-wavelength film 410, and each of the blue quantum rod films 330 respectively faces toward one full-wavelength films 410.

In addition, the arrangement direction of the green quantum rod films 310 is perpendicular to the polarization direction of the down polarizer 130, the arrangement directions of the red quantum rod films 320 and the blue quantum rod films 330 are parallel are the same with that of the down polarizer 130. That is, the arrangement direction of the red quantum rod films 320 is parallel to or the same with the arrangement direction of the blue quantum rod films 330, and the arrangement direction of the green quantum rod films 310 is perpendicular to that of the red quantum rod films 320 and the blue quantum rod films 330.

In this way, the light beams generated by the backlight module 200 activate the green quantum rod films 310, the red quantum rod films 320, and the blue quantum rod films 330. The polarization direction of the light beams emitted from the red quantum rod films 320 is the same with that of the light beams emitted from the blue quantum rod films 330. The polarization direction of the light beams emitted from the red quantum rod films 320 and the blue quantum rod films 330 is perpendicular to that of the light beams emitted from the green quantum rod films 310. The light beams emitted out from the green quantum rod films 310 pass through the half-wavelength films 420, and the polarization direction of the light beams is rotated by 90 degrees. The light beams emitted out from the red quantum rod films 320 and the blue quantum rod films 330 pass through the respective full-wavelength films 410, and the polarization direction of the light beams remains the same. At this moment, the polarization direction of the light beams passing through the wavelength film 400 is the same with the polarization direction of the down polarizer 130, and thus may pass through the down polarizer 130. Within the process, the light beams from the green quantum rod films 310 cannot pass through the full-wavelength films 410, and cannot arrive the down polarizer 130. Similarly, the light beams from the red quantum rod films 320 and from the blue quantum rod films 330 cannot pass through the half-wavelength films 420 and cannot arrive the down polarizer 130. In this way, the light beams of the three colors are prevented from being interfered by each other, and the purity of the light beams of the three colors may be enhanced. Thus, the saturation of the liquid crystal panel 100 may be enhanced.

Figure 4:
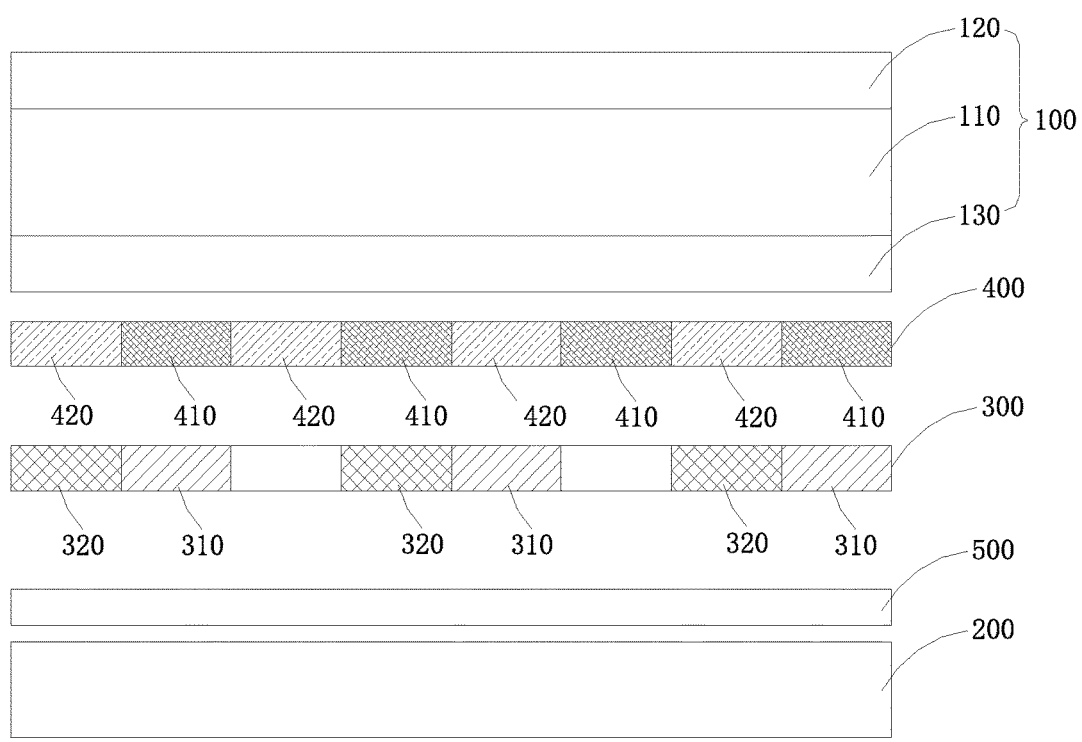
FIG. 4 is a schematic view of the LCD in accordance with a fourth embodiment.

FIG. 4 is a schematic view of the LCD in accordance with a fourth embodiment.

The difference between the third and the fourth embodiment resides in that: in the embodiment, each of the green quantum rod films 310 respectively faces toward one full-wavelength film 410, each of the red quantum rod films 320 respectively faces toward one half-wavelength film 420, and a gap between two adjacent double-colors quantum rod films also corresponds to one half-wavelength films 420.

In addition, the arrangement direction of the green quantum rod films 310 is perpendicular to the polarization direction of the down polarizer 130, the arrangement directions of the red quantum rod films 320 and the blue quantum rod films 330 are parallel are the same with that of the down polarizer 130. That is, the arrangement direction of the red quantum rod films 320 is parallel to or the same with the arrangement direction of the blue quantum rod films 330, and the arrangement direction of the green quantum rod films 310 is perpendicular to that of the red quantum rod films 320 and the blue quantum rod films 330.

In this way, the light beams generated by the backlight module 200 pass through the blue reflective polarizer 500 and arrive the quantum rod film 300. The polarization direction of the light beams from the red quantum rod films 320 is the same with that of the light beams passing through the gap between two adjacent double-colors quantum rod films. The polarization direction of the light beams from the red quantum rod films 320 and from the gap is perpendicular to that of the light beams emitted from the green quantum rod films 310. The light beams from the green quantum rod films 310 pass through the full-wavelength films 410, and the polarization direction remains the same. The light beams from the red quantum rod films 320 and from the gap between the two adjacent double-colors quantum rod films respectively pass through the corresponding half-wavelength films 420, and the polarization direction is rotated by 90 degrees. At this moment, the polarization direction passing through the wavelength film 400 is the same with the polarization direction of the down polarizer 130, and thus may arrive the down polarizer 130. Within the process, the light beams from the green quantum rod films 310 cannot pass through the full-wavelength films 410, and cannot arrive the down polarizer 130. Similarly, the light beams from the red quantum rod films 320 and from the blue quantum rod films 330 cannot pass through the half-wavelength films 420 and cannot arrive the down polarizer 130. In this way, the light beams of the three colors are prevented from being interfered by each other, and the purity of the light beams of the three colors may be enhanced. Thus, the saturation of the liquid crystal panel 100 may be enhanced.

In the embodiment, the arrangement direction of each of the quantum rod film relates to the arrangement direction of the quantum rods. In addition, the quantum rods are made by, but not limited to, quantum dots materials.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal device (LCD), comprising:
    a liquid crystal panel and a backlight module opposite to the liquid crystal panel, wherein the LCD further comprises at least one quantum rod film and at least one wavelength film, wherein the quantum rod film is between the liquid crystal panel and the backlight module, and the wavelength film is between the quantum rod film and the liquid crystal panel, light beams generated by the backlight module pass through the quantum rod film and the wavelength film in sequence to arrive the liquid crystal panel;
    wherein the quantum rod film further comprises: a plurality of green quantum rod films, a plurality of red quantum rod films, and a plurality of blue quantum rod films, wherein the red quantum rod films and the blue quantum rod films are arranged in an alternative manner and are spaced apart from each other, and the green quantum rod film is arranged between the red quantum rod film and the blue quantum rod film; and
    wherein an arrangement direction of the green quantum rod films is perpendicular to the polarization direction of the down polarizer, and the arrangement directions of the red quantum rod films and the blue quantum rod films are parallel to the polarization direction of the down polarizer.

2. The LCD as claimed in claim 1, wherein the wavelength film comprises a plurality of full-wavelength films, and a plurality of half-wavelength films arranged between two full-wavelength films, each of the green quantum rod films respectively faces toward one half-wavelength film, and each of the red quantum rod films respectively faces toward one full-wavelength film, and each of the blue quantum rod films respectively faces toward one full-wavelength films.

3. A liquid crystal device (LCD), comprising:
    a liquid crystal panel and a backlight module opposite to the liquid crystal panel, wherein the LCD further comprises at least one quantum rod film and at least one wavelength film, wherein the quantum rod film is between the liquid crystal panel and the backlight module, and the wavelength film is between the quantum rod film and the liquid crystal panel, light beams generated by the backlight module pass through the quantum rod film and the wavelength film in sequence to arrive the liquid crystal panel;
    wherein the quantum rod film further comprises: a plurality of green quantum rod films, a plurality of red quantum rod films, and a plurality of blue quantum rod films, wherein the red quantum rod films and the blue quantum rod films are arranged in an alternative manner and are spaced apart from each other, and the green quantum rod film is arranged between the red quantum rod film and the blue quantum rod film; and
    wherein an arrangement direction of the green quantum rod films is parallel to the polarization direction of the down polarizer, and the arrangement directions of the red quantum rod films and the blue quantum rod films are perpendicular to the polarization direction of the down polarizer.

4. The LCD as claimed in claim 3, wherein the wavelength film comprises a plurality of half-wavelength films, and a plurality of full-wavelength films arranged between two half-wavelength films, each of the green quantum rod films respectively faces toward one full-wavelength film, and each of the red quantum rod films respectively faces toward one half-wavelength film, and each of the blue quantum rod films respectively faces toward one half-wavelength films.

5. A liquid crystal device (LCD), comprising:
    a liquid crystal panel and a backlight module opposite to the liquid crystal panel, wherein the LCD further comprises at least one quantum rod film and at least one wavelength film, wherein the quantum rod film is between the liquid crystal panel and the backlight module, and the wavelength film is between the quantum rod film and the liquid crystal panel, light beams generated by the backlight module pass through the quantum rod film and the wavelength film in sequence to arrive the liquid crystal panel;
    wherein the wavelength film comprises a plurality of half-wavelength films, and a plurality of full-wavelength films arranged between two half-wavelength films; and wherein each of the quantum rod film comprises a plurality of double-colors quantum rod films spaced apart from each other, wherein each of the double-colors quantum rod films comprises a green quantum rod film and a red quantum rod film, and blue light beams generated by a backlight module pass through the quantum rod film and the wavelength film.

6. The LCD as claimed in claim 5, wherein the LCD further comprises a blue reflective polarizer between the quantum rod film and the backlight module, the blue light beams generated by the backlight module pass through the backplate reflective polarizer, the quantum rod film, and the wavelength films to arrive the liquid crystal panel.

7. The LCD as claimed in claim 6, wherein an arrangement direction of the green quantum rod films is perpendicular to the polarization direction of the down polarizer, and the arrangement directions of the red quantum rod films is parallel to the polarization direction of the down polarizer; and each of the green quantum rod films respectively faces toward one half-wavelength film, and each of the red quantum rod films respectively faces toward one full-wavelength film.

8. The LCD as claimed in claim 6, wherein an arrangement direction of the green quantum rod films is parallel to the polarization direction of the down polarizer, and the arrangement directions of the red quantum rod films is perpendicular to the polarization direction of the down polarizer; and wherein each of the green quantum rod films respectively faces toward one full-wavelength film, and each of the red quantum rod films respectively faces toward one half-wavelength film, and a gap between two adjacent double-colors quantum rod films faces toward one half-wavelength films.

* * * * *